Dec. 11, 1956     J. B. HIRSCHMANN     2,773,260
GOGGLES
Filed Sept. 25, 1953     2 Sheets-Sheet 1
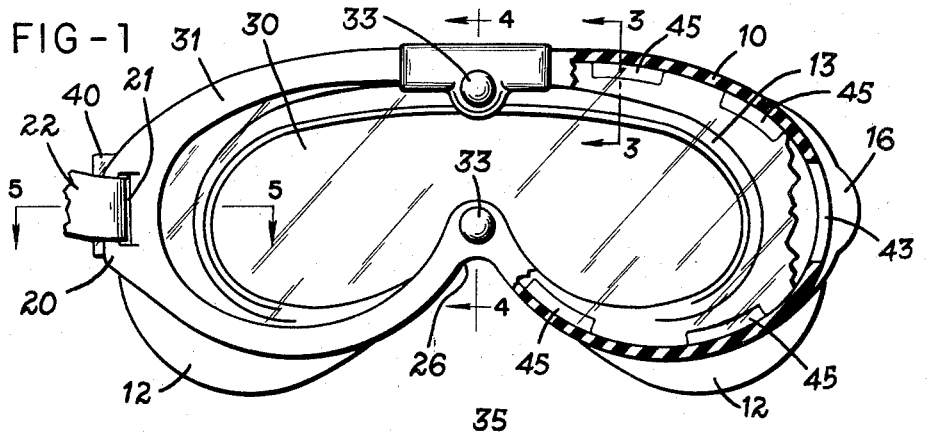
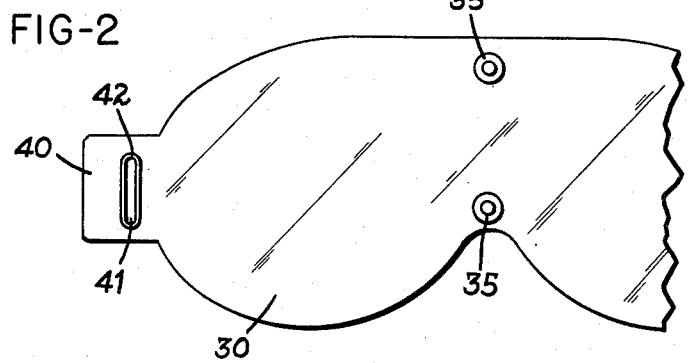
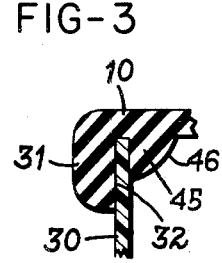
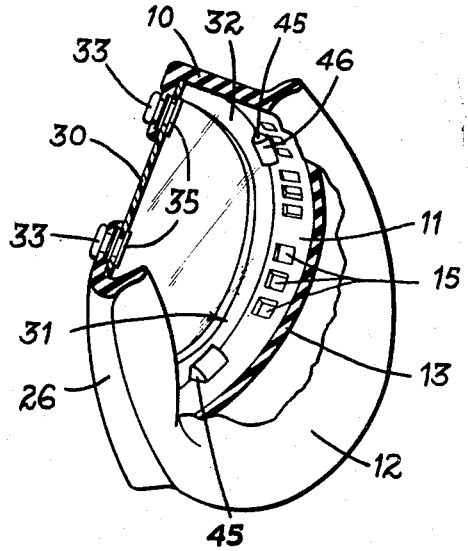
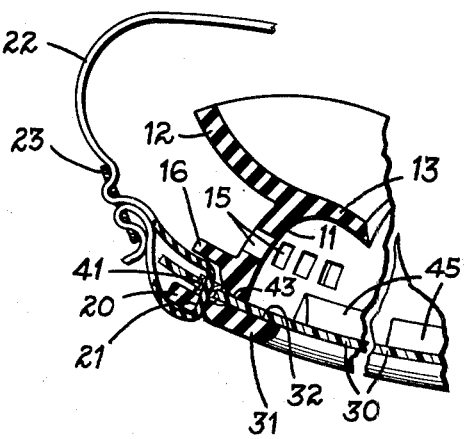
INVENTOR.
JACK B. HIRSCHMANN
BY
ATTORNEYS Dec. 11, 1956  J. B. HIRSCHMANN  2,773,260
GOGGLES
Filed Sept. 25, 1953  2 Sheets-Sheet 2

INVENTOR.
JACK B. HIRSCHMANN
BY
ATTORNEYS

United States Patent Office 2,773,260
Patented Dec. 11, 1956

2,773,260

GOGGLES

Jack B. Hirschmann, Fairhaven, Mass.

Application September 25, 1953, Serial No. 382,327

5 Claims. (Cl. 2—14)

This invention relates to goggles for eye protection and more particularly to a goggle of the single aperture type having a frame of rubber or other flexible material and a readily replaceable lens of flexible transparent plastic.

The invention has special relation to the connection between the removable lens and the goggle frame in a goggle of this type, and the primary object of the invention is to provide such a goggle wherein the lens itself and the goggle frame carry complementary fastening members which cooperate to secure the lens and frame releasably together and which also cooperate with the lens to form a fixed connection between the upper and lower portions of the frame above the nose of the wearer.

It is also an object of the invention to provide such a goggle in which the connection between the lens and the goggle frame is established without the necessity of a channel in the frame for receiving the peripheral edge of the lens and in which also an effective sealing relationship of the lens and frame is established while at the same time the lens is removable and replaceable with great ease.

Additional objects and advantages of the invention will be apparent from the following description, the accompanying drawing and the appended claims.

In the drawing:

Fig. 1 is a view in front elevation illustrating a goggle constructed in accordance with the invention and with portions broken away to illustrate details of internal construction;

Fig. 2 is a partial view in front elevation of the lens in the goggle of Fig. 1;

Fig. 3 is an enlarged fragmentary section on the line 3—3 of Fig. 1;

Fig. 4 is a vertical section taken on the line 4—4 of Fig. 1;

Fig. 5 is a fragmentary section taken on the line 5—5 of Fig. 1 and on a larger scale;

Figure 6:
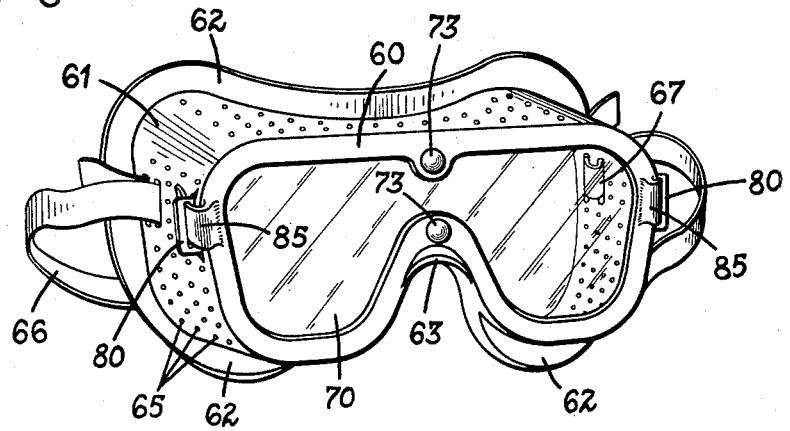
Fig. 6 is a perspective view showing another goggle constructed in accordance with the invention and utilizing a frame of soft plastic material.

Referring to the drawings, which illustrate preferred embodiments of the invention, the goggle includes a one-piece frame which is readily molded from rubber or like material of suitable flexibility. This frame includes a front rim 10 and a back portion 11 which extends rearwardly from the rim to define the eye chamber of the goggle, and the frame portion 11 is in turn provided with flanges 12 and 13 for engaging the face of the wearer. Ventilation holes 15 may be provided in frame portion 11 and are shown as located behind rib-like baffles 16, and they may be provided with replaceable filters in accordance with my joint patent with F. W. Maurer, No. 2,573,722 issued November 6, 1951. At each end of the frame is a lug 20 having a slot 21 therethrough for receiving the head strap 22. The head strap is threaded through these slotted lugs and connected to itself at each side of the wearer's head by an adjustable buckle 23.

The rim 10 of the goggle is formed to define a single aperture comprising a pair of enlarged eye portions and a connecting portion of reduced vertical extent at the center of the goggle and above the wearer's nose, the rim being formed as shown to provide a nose receiving recess 26 between the eye portions of the aperture. A lens 30 substantially complementary in shape to the rim 10 is received therewithin, and this lens may be formed of cellulose acetate or other suitably transparent flexible plastic material. Preferred results are obtained if this lens is preformed to substantially the final curved shape it occupies in the mounted position of the goggle as indicated in Fig. 5.

In order to mount the lens 30 in the frame while still providing for ready removal and replacement thereof, a flange 31 is formed on the rim 10 and is proportioned to overhang the eye aperture in such manner that its inner surface 32 forms a seat for a marginal strip extending around the periphery of the lens, and the interior of the rim adjacent the seat 32 is formed to fit against the peripheral edge of the lens. The flange 31 also carries a pair of fastener members, shown as female fasteners 33 of the well-known "Dot" type, and the lens 30 is provided with complementary male fastener members 35 which are directly secured thereto for engagement with the fastener members 33 when the lens is mounted in the frame.

Additional means are provided for releasably securing the ends of the lens to the frame, reference being made in this connection to my copending application Serial No. 325,118, filed December 10, 1952, now Patent No. 2,680,846. The lens 30 is formed at each end thereof with a tab 40 extending laterally from the viewing area of the lens, and each such tab is provided with a slot 41 therethrough proportioned to receive the head strap and preferably provided with a suitable reinforcing grommet 42. The rim 10 is provided at each end with a slot 43 extending completely therethrough at each side thereof to receive the adjacent lens tab 40. These parts are so proportioned as shown that the tabs extend outside of the goggle in underlying relation with the lugs 20 so that the slots 21 and 41 are in alignment with each other in the assembled position of the parts.

With the lens and frame of this construction as shown, the ends of the head strap may be threaded through the aligned slots 21 and 41 and around the outside of the lugs 20 to the buckles 23. It will thus be seen that this arrangement provides a positive interconnection between the lens, the goggle frame and the head strap, while at the same time all the parts of the connection are located entirely outside the field of vision through the viewing area of the lens and thus do not obstruct the vision of the wearer nor permit possible leakage of fluid through the lens such as may occur in the event of a strap-receiving slot located within the viewing area of the lens. In addition, with the lens precurved as described, relatively little pull by the head strap is required to hold the goggle fitted on the wearer's face, with resulting increased comfort.

This goggle construction offers important practical advantages from the standpoint of ease of initial fabrication of the parts as well as ease of assembly and/or replacement of the lens in the frame. Thus, the location of the male fastener members 35 on the lens itself is advantageous both in the initial manufacture of the goggle as well as in assembly of the lens in the goggle frame. This operation is also facilitated by the provision of a plurality of spaced shoulders or lugs 45 around the inner periphery of the rim, which are substantially shorter in the plane of lens 30 then the flange 31 and are advantageously formed as shown in Fig. 3 with a sloping rearward surface 46 to act as a cam for guiding the lens into seated position. In the assembled position of the lens, these lugs 45 support the lens against possible separation from the seat 32 under a severe blow or the like while at the same time being easily releasable when the lens is to be replaced, and the fitted relation of lugs 40 in slits 43 similarly supports the lens against displacement even under severe service conditions.

An additional advantage of the invention is that with the ends of the lens and frame constructed and cooperating with the head strap as described, when the goggle is mounted in place on the head of the wearer, the forces effective on the lens urge it into close sealing relationship of its marginal strip with the seat 32 and thereby insure against leakage around the edge of the goggle. As a result, it is possible and practical to do without a lens-receiving channel in the frame and in fact to do without the lugs 45 as well for many purposes. On the other hand, this lens construction is equally well adapted to use with a frame having a complete lens-receiving channel as shown, for example, in my above noted Patent No. 2,680,846, and it will also be apparent that the lugs 45 could if desired be formed as a continuous shoulder.

Figure 7:
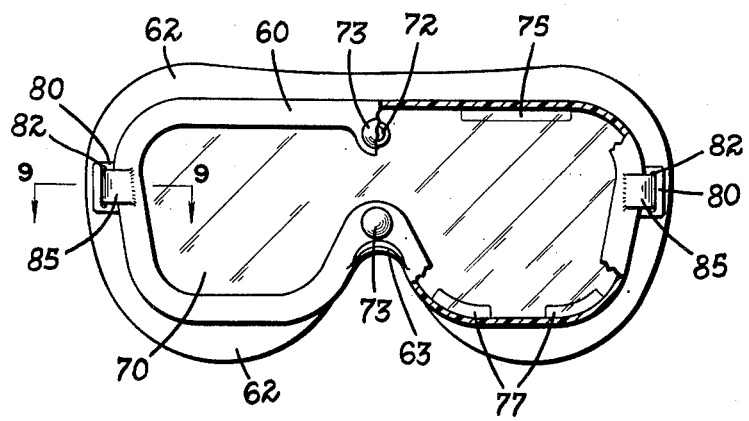
Fig. 7 is a view in front elevation of the goggle of Fig. 6 and with portions broken away to illustrate details of internal construction.
Figure 8:
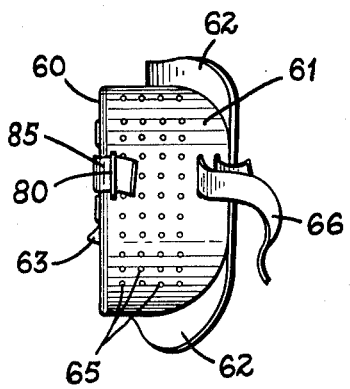
Fig. 8 is a side elevation of the goggle of Figs. 6 and 7.
Figure 9:
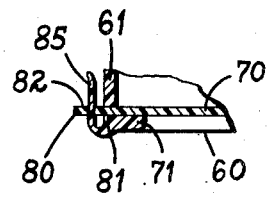
Fig. 9 is a fragmentary section on the line 9—9 of Fig. 7.

Figs. 7–9 show another construction of goggle in accordance with the invention in which the frame is constructed of a relatively soft and preferably light-transmitting plastic material such for example as polyethylene. The general configuration of this goggle resembles the drawn plastic goggle disclosed in my copending application with George P. Theroux, Serial No. 205,328, filed January 10, 1951, Patent No. 2,680,882. The frame of the goggle incudes a rim portion 60 and a back portion 61 which extends rearwardly from the rim and terminates in a flange 62 for engaging the face of the wearer, and a nose pad 63 is molded integrally with the rim 60. Ventilating holes 65 may be provided in the frame portion 61 as shown. Since this frame is of such soft material that it might be unduly compressed if the head strap 66 were connected to the lens or the front of the frame, the head strap is shown as connected to the goggle by means of loops 67 provided near the back edge of the frame portion 61 at opposite sides of the goggle.

The lens 70 is generally of the configuration already described in connection with the lens 30 except for such revision of size and shape as is required to fit the somewhat smaller rim 60. The marginal strip around the lens fits against the flange 71 on the front of the rim 60, and the lens carries fastener members 72 which cooperate with complementary fastener members 73 mounted in the flange 71. The shoulders 75 and 77 support the back edges of the lens in the same manner as described in connection with the shoulders or lugs 45.

Each end of the lens 70 includes a tab 80 similar to the tabs 40 and similarly fitting through a slit 81 in the adjacent side portion of the rim 60. In order to assure against possible pulling out of these tabs under conditions of severe use of the goggle, each tab is provided with a slot 82 therethrough, and the goggle rim is formed with a short integral strap 85 adapted to be threaded through this slot as shown particularly in Fig. 9. With the goggle frame formed of a soft plastic material as described, this threading operation is easily effected, and the natural frictional resistance of the plastic material against removal from the slot will effectively hold these straps 85 in place during use of the goggle while at the same time they can be easily removed for replacement of the lens.

While the articles herein described constitute preferred embodiments of the invention, it is to be understood that the invention is not limited to these precise articles, and that changes may be made therein without departing from the scope of the invention which is defined in the appended claims.

What is claimed is:

1. A goggle comprising a one-piece frame including a front rim defining a single viewing aperture having portions for both eyes connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material adapted to be received within said rim and of substantially complementary shape thereto, a single continuous front flange on said rim proportioned to overhang and form a substantially open continuous seat for the outer marginal strip of the front of said lens, complementary fastening members carried by said flange and said marginal strip of said lens and located in vertical alignment above and below said reduced portion of said aperture for releasably connecting said lens to said flange leaving the inner surface of said marginal strip substantially exposed within the interior of said frame, means forming shoulders spaced with relation to each other around the inner periphery of said rim and spaced rearwardly with respect to said flange for cooperation therewith to support said lens from behind, said shoulders being of lesser dimensions in the plane of said lens than said flange and having sloping rearward surfaces to guide said lens into seated position against said flange, and means for releasably securing the ends of said lens to said frame.

2. A goggle comprising a one-piece frame including a front rim defining a single viewing aperture having portions for both eyes connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material adapted to be received within said rim and of substantially complementary shape thereto, a single continuous front flange on said rim proportioned to overhang and form a substantially open continuous seat for the outer marginal strip of the front of said lens, complementary fastening members carried by said flange and said marginal strip of said lens and located in vertical alignment above and below said reduced portion of said aperture for releasably connecting said lens to said flange leaving the inner surface of said marginal strip substantially exposed within the interior of said frame, said lens having a tab extending outwardly therefrom at each end thereof, said frame having a slit therethrough at each end thereof for receiving the adjacent said lens tab, means for releasably securing said tabs to said frame, and means forming shoulders on the inner periphery of said rim spaced between said slits and said fastening means and spaced rearwardly with respect to said flange for cooperation with said flange to support said lens from behind, said shoulders being of lesser dimensions in the plane of said lens than said flange to facilitate mounting of said lens between said shoulders and said flange.

3. A goggle comprising a one-piece frame including a front rim defining a single viewing aperture having portions for both eyes connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material adapted to be received within said rim and of substantially complementary shape thereto, a single continuous front flange on said rim proportioned to overhang and form a substantially open continuous seat for the outer marginal strip of the front of said lens, complementary fastening members carried by said flange and said marginal strip of said lens and located in vertical alignment above and below said reduced portion of said aperture for releasably connecting said lens to said flange leaving the inner surface of said marginal strip substantially exposed within the interior of said frame, said lens having a tab extending outwardly therefrom at each end thereof, said frame having a slit therethrough at each end thereof for receiving the adjacent said lens tab, each said tab having a slot through the outer portion thereof, said rim having a slot through each outer end thereof in overlying relation with said slot in said lens tab, a head strap having the ends thereof threaded through said overlying slots to retain said lens and rim in assembled relation and to urge said lens to a position of close sealing relation between said marginal strip thereon and said seat, means forming shoulders spaced around the inner periphery of said rim between said slits and said fastening means in rearwardly spaced relation with said front flange for cooperation therewith to support said lens from behind, and said shoulders being of lesser dimensions in the plane of said lens than said front flange to facilitate mounting of said lens between said shoulders and said front flange.

4. A goggle comprising a one-piece frame of flexible material including a front rim defining a single viewing aperture having portions for both eyes of the wearer connected by a portion of reduced vertical extent above the nose of the wearer, said frame also including a portion extending rearwardly from said rim to define an eye chamber and having thereon a peripheral flange adapted to fit against the face of the wearer, a one-piece lens of flexible material adapted to be received within said rim and of substantially complementary shape thereto, a single continuous front flange on said rim proportioned to overhang and form a substantially continuous seat for the outer marginal strip on the front of said lens, a pair of releasable fastener members mounted on the inside of said front flange respectively above and below said viewing aperture, a pair of complementary fastener members mounted in said marginal strip of said lens in position for engagement with said fastener members on said flange to secure said lens in said frame while providing for release thereof by disconnection of said fastener members and deformation of said frame, said frame including a plurality of integral shoulder portions spaced with relation to each other around the inner periphery of said rim and spaced rearwardly with respect to said front flange for cooperation therewith to support said lens from the rear thereof, and releasable means connected with the ends of said frame for mounting said goggle on the head of the wearer.

5. A goggle comprising a one-piece frame of flexible material including a front rim defining a single viewing aperture having portions for both eyes of the wearer connected by a portion of reduced vertical extent above the nose of the wearer, a one-piece lens of flexible material adapted to be received within said rim and of substantially complementary shape thereto including a recess in the lower edge thereof for overlying the nose of the wearer, a single continuous front flange on said rim proportioned to overhang and form a substantially continuous seat for the outer marginal strip on the front of said lens, said flange and said rim each including a saddle-like portion for entry in said nose recess in said lens, releasable fastener means mounted on the inside of said front flange and including a releasable fastener member carried by said saddle-like portion of said flange, complementary fastener means mounted in said marginal strip of said lens in position for engagement with said fastener means on said flange, said complementary fastener means including a fastener member located for engagement with said fastener member on said flange to secure said saddle-like portion of said rim within the complementary portion of said lens while providing for release of said lens from said frame by disconnection of said fastener means and deformation of said frame, said frame including a plurality of integral shoulder portions spaced with relation to each other around the inner periphery of said rim and spaced rearwardly with respect to said front flange for cooperation therewith to support said lens from the rear thereof, and releasable means connected with the ends of said frame for mounting said goggle on the head of the wearer.

References Cited in the file of this patent

UNITED STATES PATENTS

| 1,095,089 | Dinn | Apr. 28, 1914 |
| 2,387,851 | Lown et al. | Oct. 30, 1945 |

FOREIGN PATENTS

| 97,748 | Switzerland | Feb. 1, 1923 |
| 1,016,444 | France | Aug. 17, 1952 |